(12) United States Patent
Wozniak et al.

(10) Patent No.: US 6,784,973 B1
(45) Date of Patent: Aug. 31, 2004

(54) QUALITY ASSURANCE SYSTEM FOR RETAIL PHOTOFINISHING

(75) Inventors: Timothy M. Wozniak, Rochester, NY (US); Ronald J. Craven, Highton (AU); Grant Ahlrichs, Linslade (GB); Phil H. Davies, Nr Wargrave (GB)

(73) Assignee: Eastman Kodak Company, Rochester, NY (US)

( * ) Notice: Subject to any disclaimer, the term of this patent is extended or adjusted under 35 U.S.C. 154(b) by 710 days.

(21) Appl. No.: 09/652,190

(22) Filed: Aug. 31, 2000

(51) Int. Cl.[7] .............................................. G03B 27/52
(52) U.S. Cl. ........................................ 355/40; 702/83
(58) Field of Search ........................... 702/82; 355/40; 718/104; 714/26; 382/263; 358/1.14; 347/172; 434/247; 396/567; 705/27; G03D 13/00; H04N 1/00

(56) References Cited

U.S. PATENT DOCUMENTS

| | | | | |
|---|---|---|---|---|
| 4,581,762 A | * | 4/1986 | Lapidus et al. ............. | 382/263 |
| 4,937,784 A | * | 6/1990 | Masai et al. ................ | 718/104 |
| 5,123,017 A | * | 6/1992 | Simpkins et al. ............ | 714/26 |
| 6,570,640 B1 | * | 5/2003 | Garfinkle et al. ............ | 355/40 |
| 6,590,671 B1 | * | 7/2003 | Kinjo ....................... | 358/1.12 |

FOREIGN PATENT DOCUMENTS

DE          1137248 A2 *  1/2001  ............ H04N/1/00
JP          0628874 A2 *  2/1991  ............ G03B/27/32

* cited by examiner

Primary Examiner—John Barlow
Assistant Examiner—Victor J. Taylor
(74) Attorney, Agent, or Firm—Thomas H. Close; Paul A. Leipold (57) ABSTRACT

A quality assurance system for retail photofinishing includes a communication network; a retail photofinishing site including photofinishing equipment, a client computer connected to the communication network, and a process monitoring device connected to the computer; and a server located at a service center and connected to the communication network. Client software running on the client computer includes a quality management application for providing quality information to a manager of the photofinishing site; an operator testing and training application for training and certifying an operator of the retail site and providing testing, training and certification related data to the server and the quality management application; a quality evaluation application for monitoring the quality of the product and services provided by the photofinishing site and providing quality related data to the server and the quality management application; a process control application for monitoring the condition of the photofinishing equipment at the site and providing process control data to the server and to the quality management application. Server software running on the server includes an application for collecting, storing, and analyzing data from a plurality of photofinishing sites and producing a report on the quality of products and services provided by the sites.

21 Claims, 11 Drawing Sheets

QUALITY ASSURANCE SYSTEM FOR RETAIL PHOTOFINISHING

FIELD OF THE INVENTION

The present invention is related to photofinishing and more particularly to a system and method for assuring the quality of products and services provided by photofinishers.

BACKGROUND OF THE INVENTION

A retail photofinishing site is a business that has the capability using on-site equipment, such as photofinishing mini-labs, to locally produce photofinishing services directly for a customer. There are currently over one hundred thousand retail photofinishing sites worldwide, and the number is increasing rapidly. A wholesale photofinishing laboratory receives photofinishing orders from a plurality of distributed outlets, such as camera stores, department stores, grocery stores, and drug stores that do not have on-site photofinishing capability, and fulfills the photofinishing orders for the retail outlets. There are currently a few hundred wholesale photofinishers world wide.

Presently, manufacturers of photographic equipment and supplies such as the Eastman Kodak Company license their brand name to wholesale photofinishers. It would be desirable for such manufacturers to leverage their brand identity by licensing the use of their brand name to their retail photofinishing customers. To protect the brand, the level of quality of branded products and services from the retail photofinishers must be controlled. Existing systems employed by photographic manufacturers for assuring quality of the wholesale photofinishers, primarily include manually implemented processes and measures requiring a high degree of personal involvement and contact by representatives of the photographic manufacturer. It is primarily because of the high level of personal interaction required to assure quality, that manufacturer branded output is currently limited to a relatively few large volume wholesale photofinishing laboratories.

Efforts to provide quality control for retail photofinishing sites have concentrated on the chemical processing aspect of the photofinishing operation. For example one approach to providing quality assurance in a retail photofinisher is the Kodatel™ system wherein manufacturer supplied control materials are processed in the retail site's equipment and measured by a densitometer to produce process control data relating to the chemical processes used at the retail photofinishing site. In this system, there is not necessarily a connection between the manufacturer and the retail site. Since these quality assurance approaches for retail photofinishing sites do not address all aspects of quality experienced by the consumer, it has not been the practice of the industry to license the photographic manufacturers brand to retail photofinishers. There is a need therefore for an improved quality assurance system for retail photofinishing that can enable the broader licensing of the photographic manufacturers' brand name.

SUMMARY OF THE INVENTION

The need is met according to the present invention by providing a quality assurance system for retail photofinishing including a communication network; a retail photofinishing site including photofinishing equipment, a client computer connected to the communication network, and a process monitoring device connected to the computer; and a service center computer located at a service center and connected to the communication network. Client software running on the client computer includes: a quality management application for providing quality information to a manager of the photofinishing site; an operator testing and training application for training and certifying an operator of the retail site and providing testing, training and certification related data to the service center and the quality management application; a quality evaluation application for monitoring the quality of the product and services provided by the photofinishing site and providing quality related data to the service center and the quality management application; a customer feedback application for providing customer feedback information to the quality management application and to the service center; and a process control application for monitoring the condition of the photofinishing equipment at the site and providing process control data to the service center and to the quality management application. Software running on the service center computer, includes an application for collecting storing and analyzing data from a plurality of photofinishing sites and producing a report on the quality of products and services provided by the sites.

DETAILED DESCRIPTION OF THE INVENTION

Figure 1:
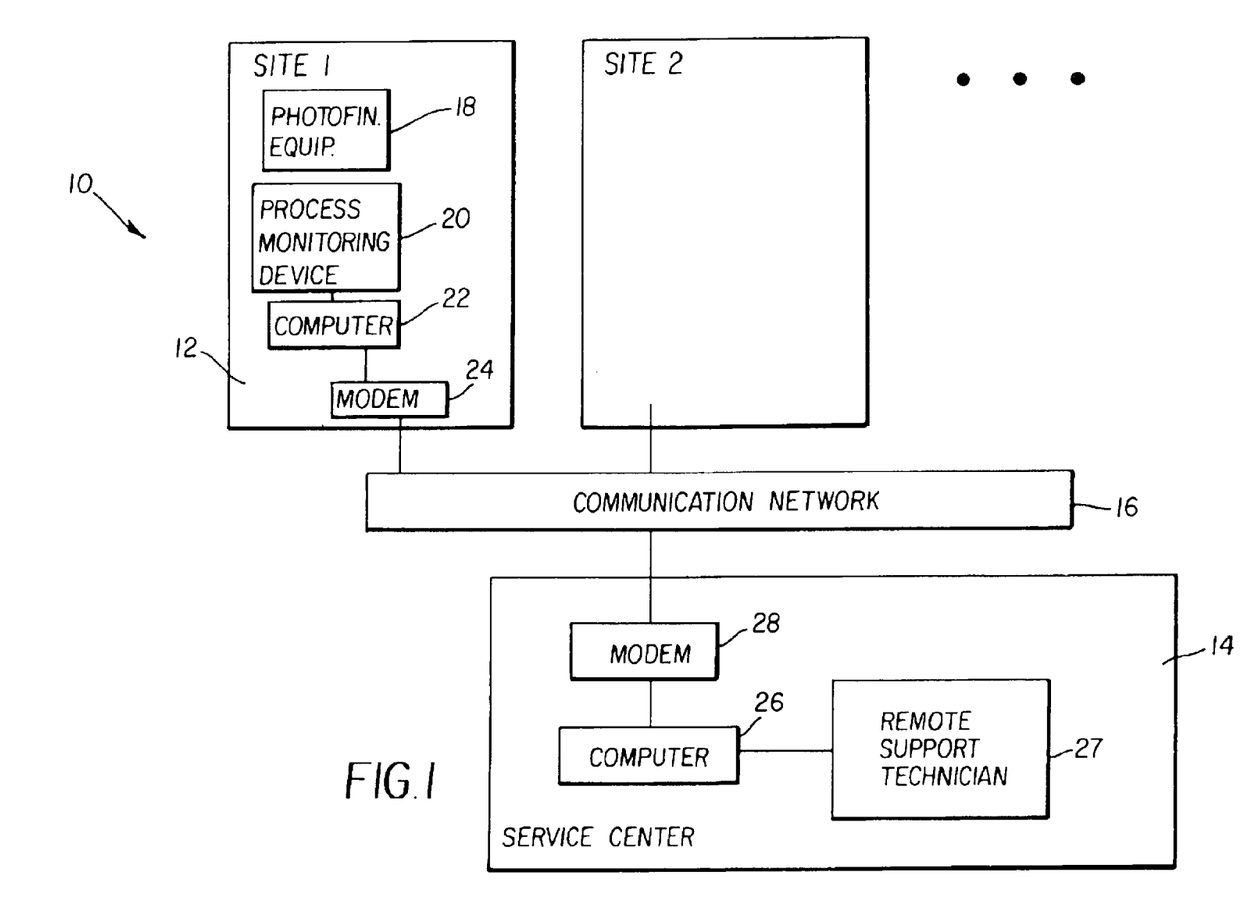
FIG. 1 is a block diagram showing a photofinishing system including a retail photofinishing site and a service center operated by a photographic manufacturer.

Referring to FIG. 1 a photofinishing system 10 includes a plurality of retail photofinishing sites 12 and a service center 14 connected to a communication network 16 such as phone line, or a virtual private network to reduce telephone costs. The retail photofinishing site 12, includes photofinishing equipment 18 such as a film processor, printer/paper processor. The photofinishing equipment may also include a film or print scanner for capturing digital images from film or prints, a digital printer for printing the digital images produced by the scanner or from digital images captured by a digital camera.

The retail photofinishing site includes a process monitoring device 20, such as a densitometer, for making physical measurements on the output of the photofinishing equipment 18. The measurements are supplied to a computer 22 that runs software applications as described below to assure the quality of the products and services provided by the retail photofinishing site. The computer 22 is connected to a modem 24 for communicating on the communication network 16.

The service center 14 includes a service center computer 26 and a modem 28 connected to the service center computer 26 for communicating with retail photofinishing sites 12. The service center computer 26 runs software applications as described below, including remote service applications that cooperate with the software applications at the retail photofinishing sites 12 to facilitate the interaction of the remote support technician 27 with the retail photofinishing sites 12 either by phone or in person, to assure the quality of the products and services provided by the photofinishing sites 12.

Figure 2:
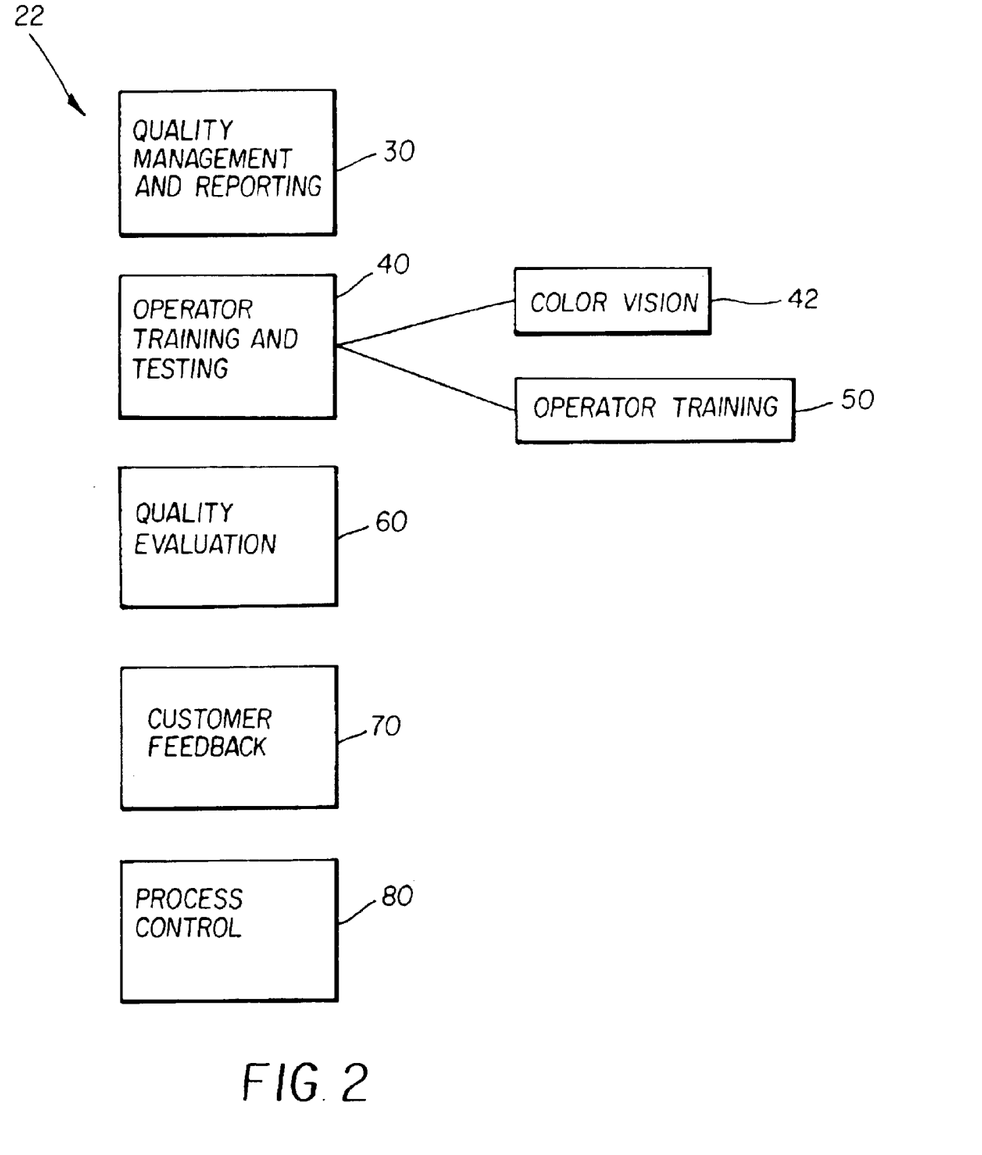
FIG. 2 is a block diagram showing the software applications running in the client computer of FIG. 1.

Referring to FIG. 2, the software applications running on the computer 22 at the retail site will now be described. The client computer 22 includes the following applications which are described below: quality management and reporting 30; operator training and testing 40; quality evaluation 60; customer feedback collection 70; and process control 80.

Figure 3:
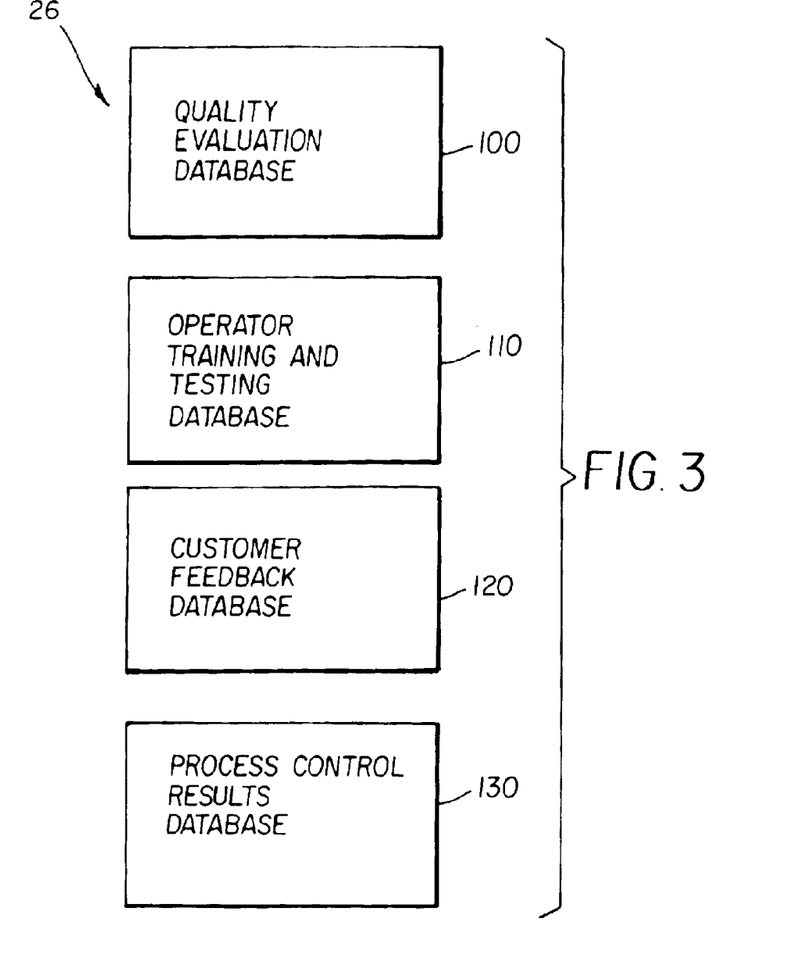
FIG. 3 is a block diagram of the software application running in the service center computer of FIG. 1.

Referring to FIG. 3, the software applications running on the service center computer 26 will now be described. The service center computer 26 includes the following applications which are described below: quality evaluation database 100; operator training and testing database 110; customer feedback database 120; and process control database 130.

Figure 4:
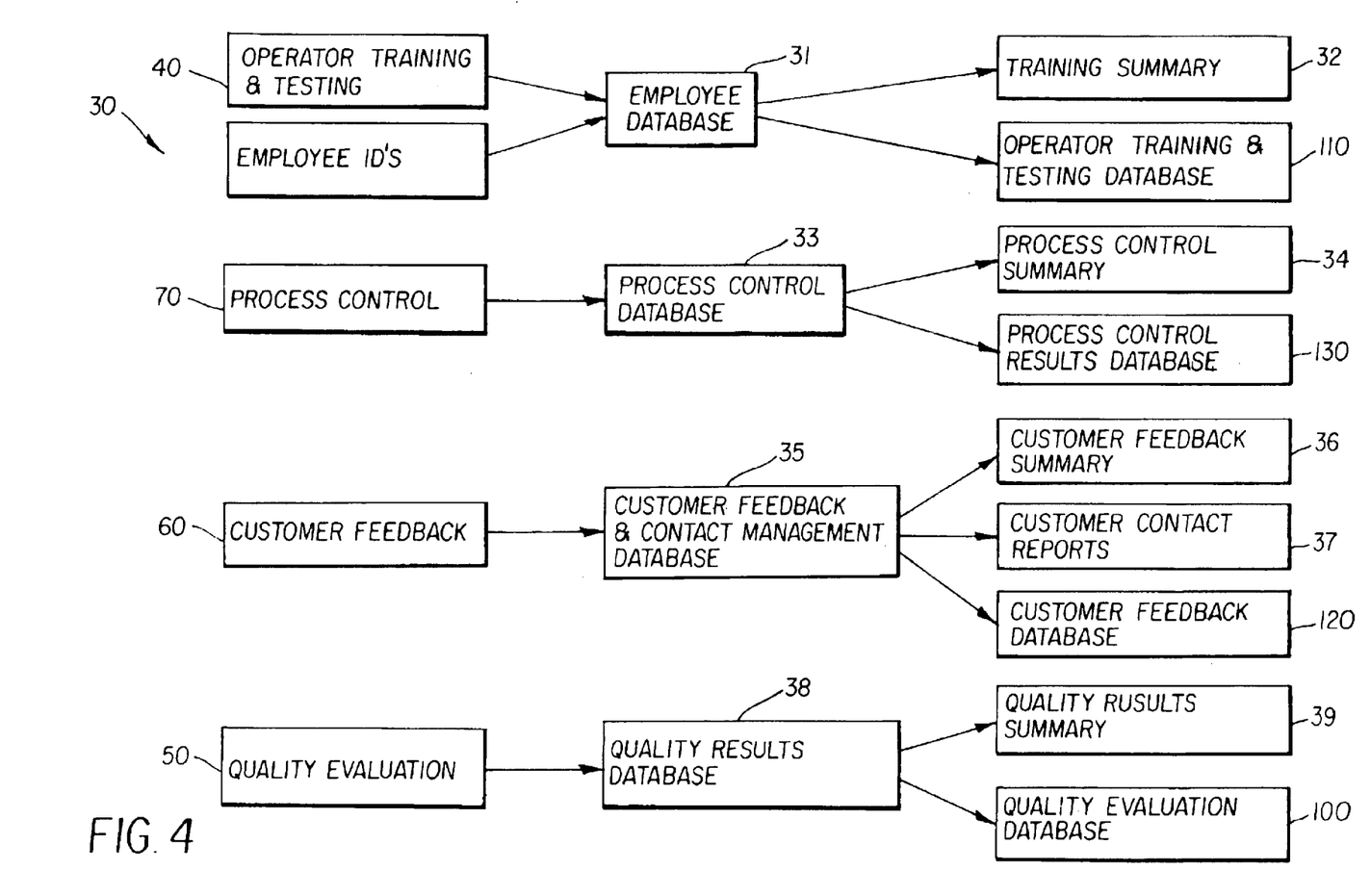
FIG. 4 is a block diagram showing the details of the quality management application running on the client computer of FIG. 2.

Referring to FIG. 4, the Quality management and reporting application 30 of the client computer 22 will now be described. The quality management and reporting application 30 consists of the employee database 31, the process control database 33, the customer feedback and contact management database 35, and the quality results database 38. The employee database 31 is fed with employee identification information by the retail site manager, and operator training and testing information by the operator training and testing application 40. The employee database 31 in turn provides training summary reports 32 to the retail site manager and to the operator training and testing database 110 on the service center computer 26 via the client modem 24, the communications network 16, and the service center modem 28. The process control database 33 is fed with process control information by the process control application 80. The process control database 33 in turn provides process control summary reports 34 to the retail site manager and process control data to the process control results database 130 on the service center computer 26 via the client modem 24, the communications network 16, and the service center modem 28. The customer feedback and contact management database 35 is fed with customer feedback and contact information by the customer feedback application 70. The customer feedback and contact management database 35 in turn provides customer feedback summary reports 36 and customer contact log reports 37 to the retail site manager and customer feedback data to the customer feedback database 120 on the service center computer 26 via the client modem 24, the communications network 16, and the service center modem 28. The quality results database 38 is fed with quality evaluation information by the quality evaluation application 60. The quality results database 38 in turn provides quality results summary reports 39 to the retail site manager and quality results information to the quality evaluation database 100 on the service center computer 26 via the client modem 24, the communications network 16, and the service center modem 28.

Figure 5:
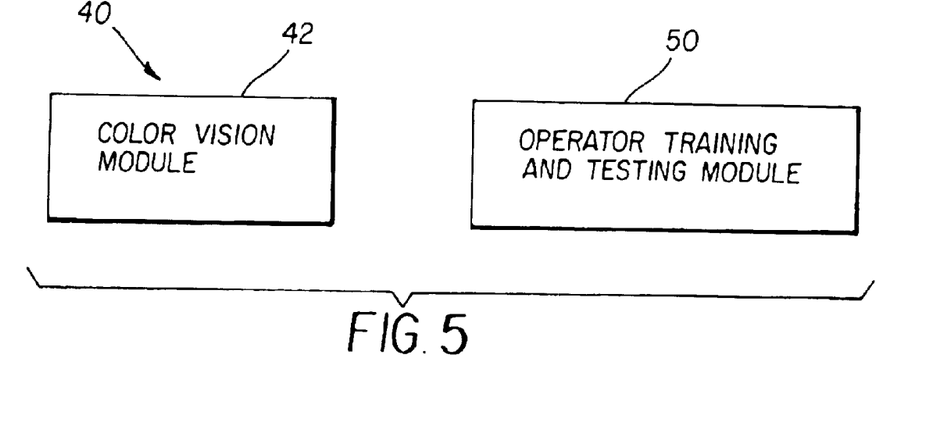
FIG. 5 is a block diagram showing the details of the operator training and testing application running on the client computer of FIG. 2.

Referring to FIG. 5, the operator training and testing application 40 will now be described. The operator training and testing application 40 consists of the color vision test module 42 and the operator training and testing module 50.

Figure 6:
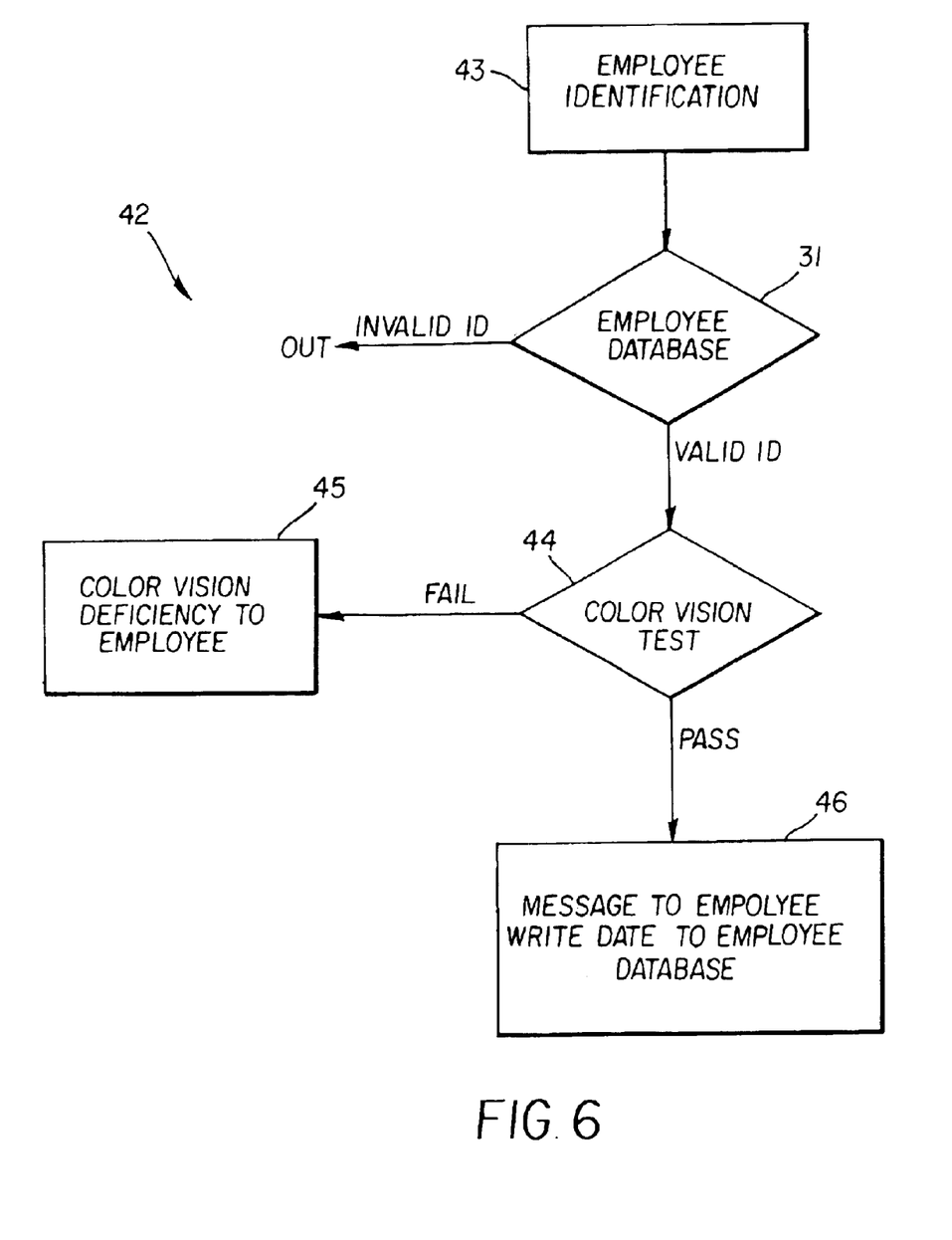
FIG. 6 is a block diagram showing the details of the color vision portion of the operator training and testing application of FIG. 5.

Referring to FIG. 6, the color vision test module 42 of the operator training and testing application 40 will now be described. The color vision test module 42 begins with the entrance of an employee identification by the employee. The color vision test module 42 checks the employee database 31 for the validity of the entered employee identification 43. If the entered employee identification does not match an employee identification in the employee database 31, the color vision test module 42 terminates. If the entered employee identification matches an employee identification in the employee database 31, the color vision test module 42 proceeds with the color vision test 44. The color vision test 44 consists of a short introduction to possible color vision deficiencies followed by a demonstration to familiarize the employee with the test. The actual test consists of a pre-screening of six different plates followed by a more specific screen of fourteen additional plates if there are incorrect answers in the pre-screen. These plates are modeled after "Ishihara's Tests For Color Blindness" and are designed to show blue-yellow or red-green color vision deficiencies. If the employee does not pass the color vision test 44, the module informs the employee of the color vision deficiency 45 and terminates. If the employee passes the color vision test 44, the color vision test module 42 informs the employee 46, writes the time and date for the pass of the color vision test 44 to the employee identification in the employee database 31 and terminates.

Figure 7:
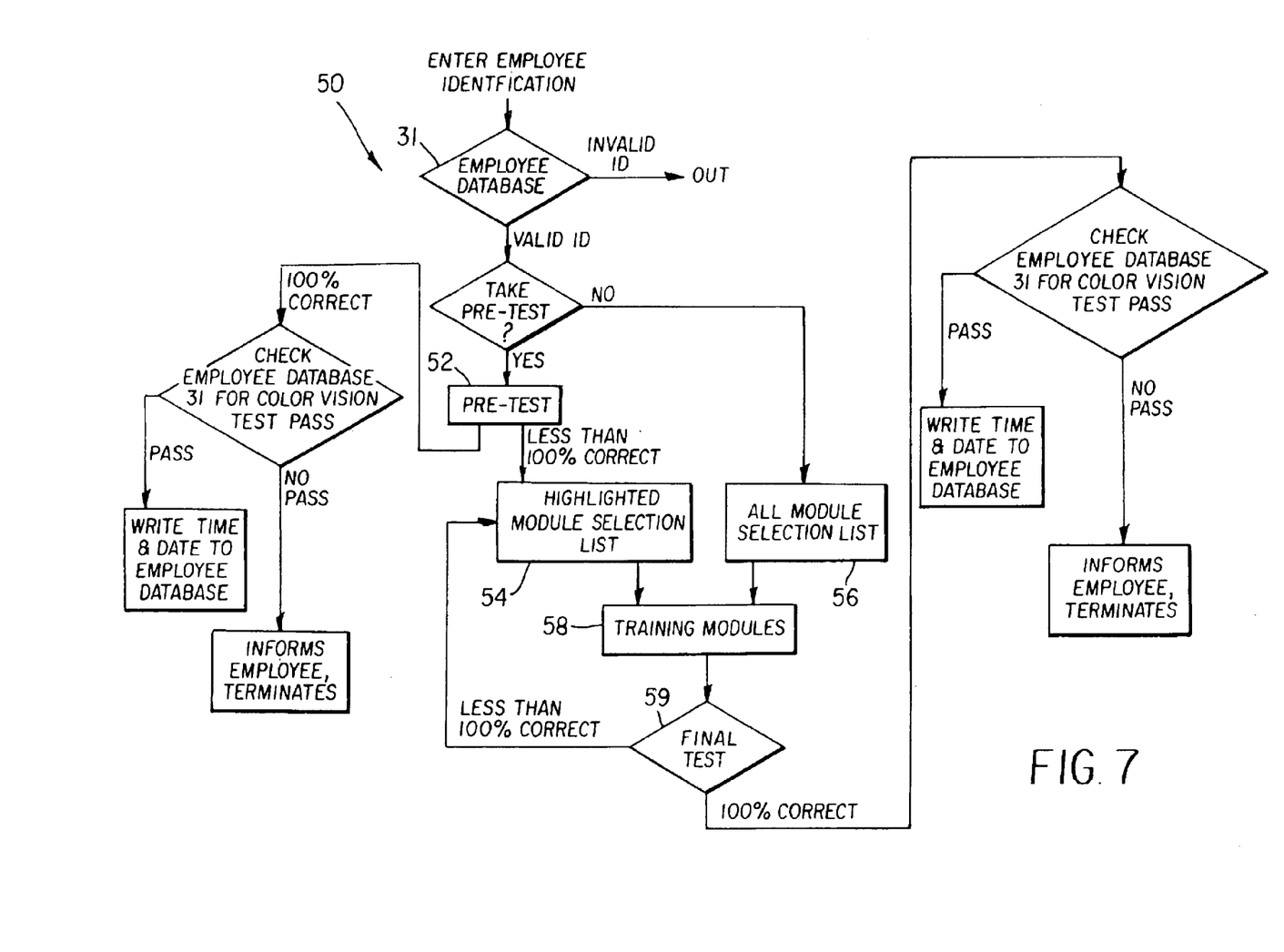
FIG. 7 is a block diagram showing the details of the operator training and testing portion of the operator training and testing application of FIG. 5.

Referring to FIG. 7, the operator training and testing module 50 will now be described. The operator training and testing module 50 consists of the following topics: Understanding Color, Print Grading, Chemical Management, Minilab Maintenance, Customer Delight, Assertiveness, and Retail Selling. The operator training and testing module 50 begins with the entrance of an employee identification by the employee. The operator training and testing module 50 checks the employee database 31 for the validity of the entered employee identification. If the entered employee identification does not match an employee identification in the employee database 31, the operator training and testing module 50 terminates. If the entered employee identification matches an employee identification in the employee database 31, the operator training and testing module 50 offers a choice to the employee to take a pre-test or not. If the employee chooses not to take the pre-test, the operator training and testing module 50 proceeds to offer the employee a list of all training modules 56 and the employee proceeds through each training module 58. If the employee chooses to take the pre-test, the operator training and testing module 50 administers the pre-test 52. At the conclusion of the pre-test 52, if the score is 100% correct, the operator training and testing module 50 checks the employee database 31 for a passed color vision test 44. If there is a record of a passed color vision test 44, the operator training and testing module 50 informs the employee and writes the time and date for the pass of the operator training 50 to the employee database 31 and terminates. If there is no record in the employee database 31 of a passed color vision test 44, the operator training and testing module 50 informs the employee that the color vision test 44 must be passed prior to receiving credit for operator training and terminates. If the pre-test 52 score is less than 100%, the operator training and testing module 50 displays for the employee a list of training modules 54 highlighted with training modules relevant to the missed questions on the pre-test 52 and the employee proceeds through each highlighted training module 58. At the completion of the training modules 58, the employee is offered a final test 59. Prior to the final test 59 being administered, the operator training and testing module 50 checks the employee database 31 for a passed color vision test 44. If there is no record in the employee database 31 of a passed color vision test 44, the operator training and testing module 50 informs the employee that the color vision test 44 must be passed prior to taking the final test 59 and terminates. If there is a record of a passed color vision test 44, the operator training and testing module 50 proceeds to administer the final test 59. At the conclusion of the final test 59, if the score is 100%, the operator training and testing module 50 informs the employee and writes the time and date for the pass of the operator training 50 to the employee database 31 and terminates. If the score for the final test 59 is less than 100% the operator training and testing module 50 displays for the employee a list of training modules 54 highlighted with training modules relevant to the missed questions on the final test 59 and the employee proceeds through the relevant training modules 58. The employee proceeds in this fashion until the final test 59 is passed. A bookmarking feature in the operator training and testing module 50 allows an employee to exit at any time and upon reentry at a later time, go to directly to the previous exit point.

Figure 8:
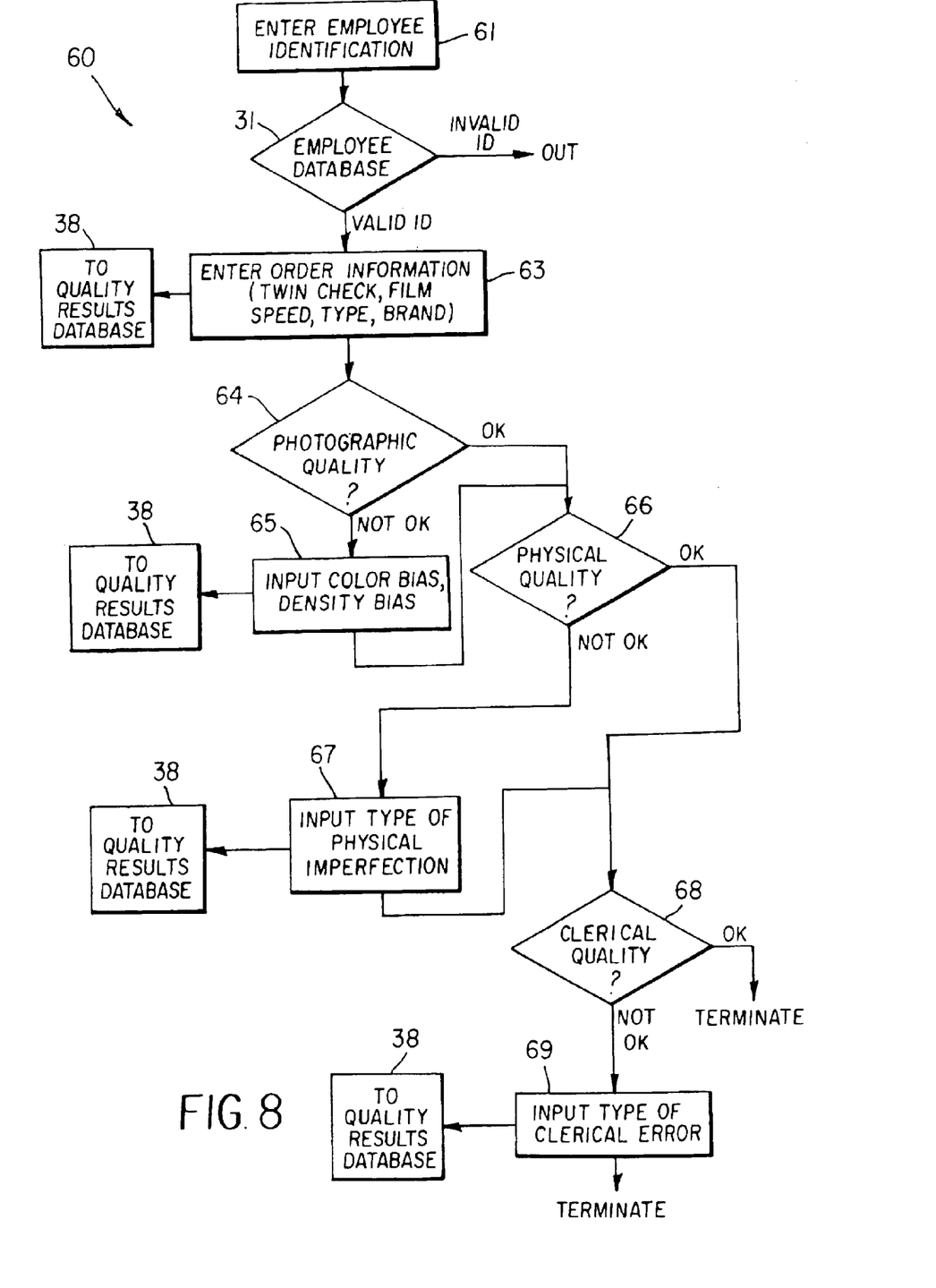
FIG. 8 is a block diagram showing the details of the quality evaluation application running on the client computer of FIG. 5.

Referring to FIG. 8, the quality evaluation application 60 will now be described. The quality evaluation application 60 begins with the entrance of an employee identification 61 by the employee. The quality evaluation application 60 checks the employee database 31 for the validity of the entered employee identification. If the entered employee identification does not match an employee identification in the employee database 31, the quality evaluation application 60 terminates. If the entered employee identification matches an employee identification in the employee database 31, the quality evaluation application 60 allows the entry of order identification information (twin check number, film type, speed, film brand) 63 by the employee. The quality evaluation application 60 writes this information to the quality results database 38. The quality evaluation application 60 then asks for input by the employee on photographic quality 64. If the employee judges that photographic quality is not acceptable, the quality evaluation application 60 collects input from the employee on the type of photographic imperfection 65 and writes this information to the quality results database 38, and proceeds to ask for input from the employee on physical quality 66. If the employee judges that photographic quality is acceptable, the quality evaluation application 60 proceeds to ask for input from the employee on physical quality 66. If the employee judges that physical quality is not acceptable, the quality evaluation application 60 collects input from the employee on the type of physical imperfection 67 and writes this information to the quality results database 38, and proceeds to ask for input from the employee on clerical quality 68. If the employee judges that physical quality is acceptable, the quality evaluation application 60 proceeds to ask for input from the employee on clerical quality 68. If the employee judges that clerical quality is not acceptable, the quality evaluation application 60 collects input from the employee on the type of clerical imperfection 69 and writes this information to the quality results database 38, and terminates. If the employee judges that clerical quality is acceptable, the quality evaluation application 60 terminates.

Figure 9:
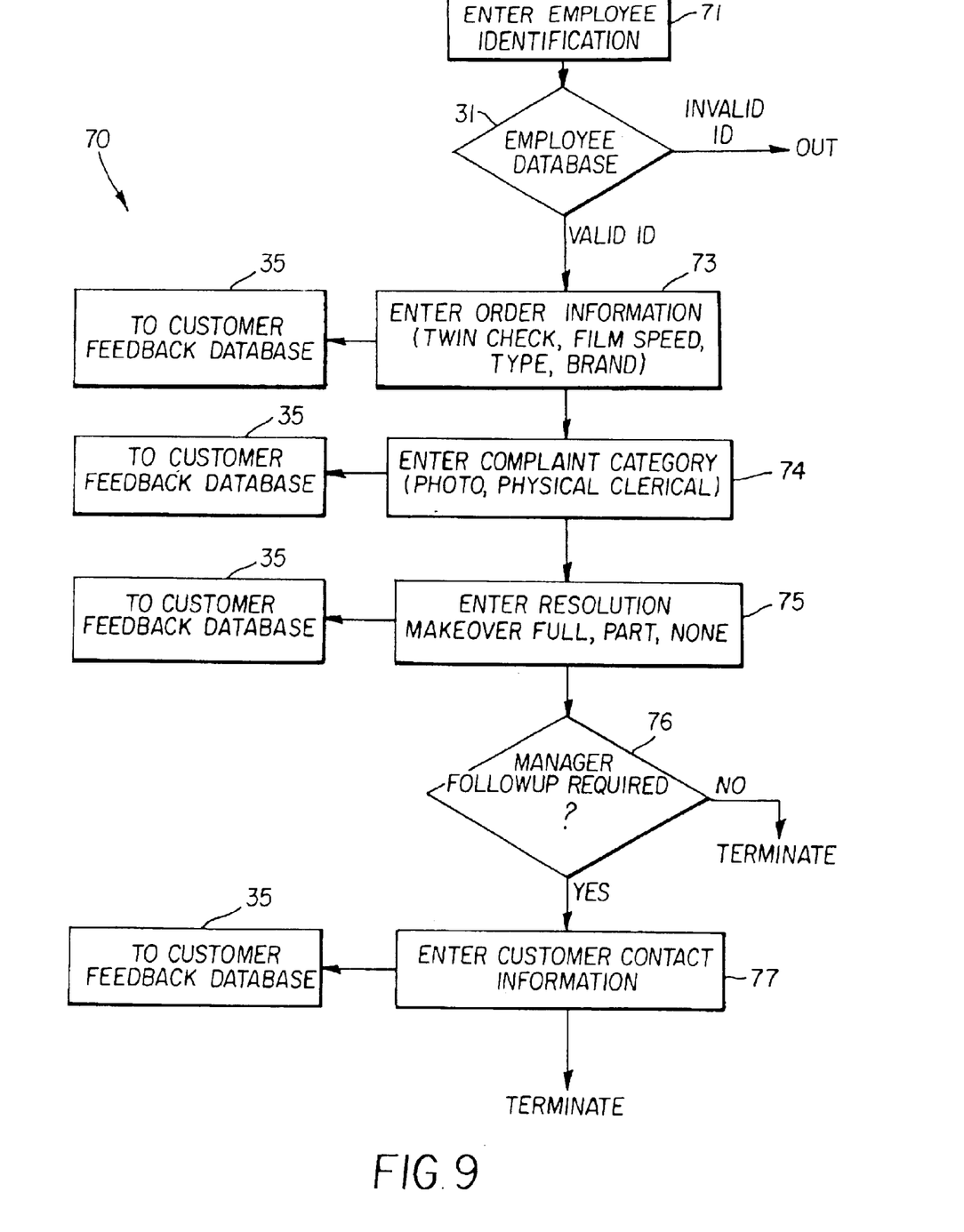
FIG. 9 is a block diagram showing the details of the customer feedback application running on the client computer of FIG. 5.

Referring to FIG. 9, the customer feedback application 70 will now be described. The customer feedback application 70 begins with the entrance of an employee identification 71 by the employee. The customer feedback application 70 checks the employee database 31 for the validity of the entered employee identification. If the entered employee identification 71 does not match an employee identification in the employee database 31, the customer feedback application 70 terminates. If the entered employee identification matches an employee identification in the employee database 31, the customer feedback application 70 allows the entry of order identification information (twin check number, film type, speed, film brand) 73 by the employee. The customer feedback application 70 writes this information to the customer feedback database 35. The customer feedback application 70 then asks for input by the employee on the category (photographic, physical, clerical) of the customer complaint 74. The customer feedback application 70 writes this information to the customer feedback database 35. The customer feedback application 70 then asks for input by the employee on the resolution (make over all, part, or none of the order) of the customer complaint 75. The customer feedback application 70 writes this information to the customer feedback database 35. The customer feedback application 70 then asks for input by the employee on the level of manager follow-up (required or not required) of the customer complaint 76. If manager follow-up is required, the customer feedback application 70 asks for customer contact information 77 to be input by the employee and writes this information to the customer contact database 37 and terminates. If manager follow-up is not required, the customer feedback application 70 terminates.

Figure 10:
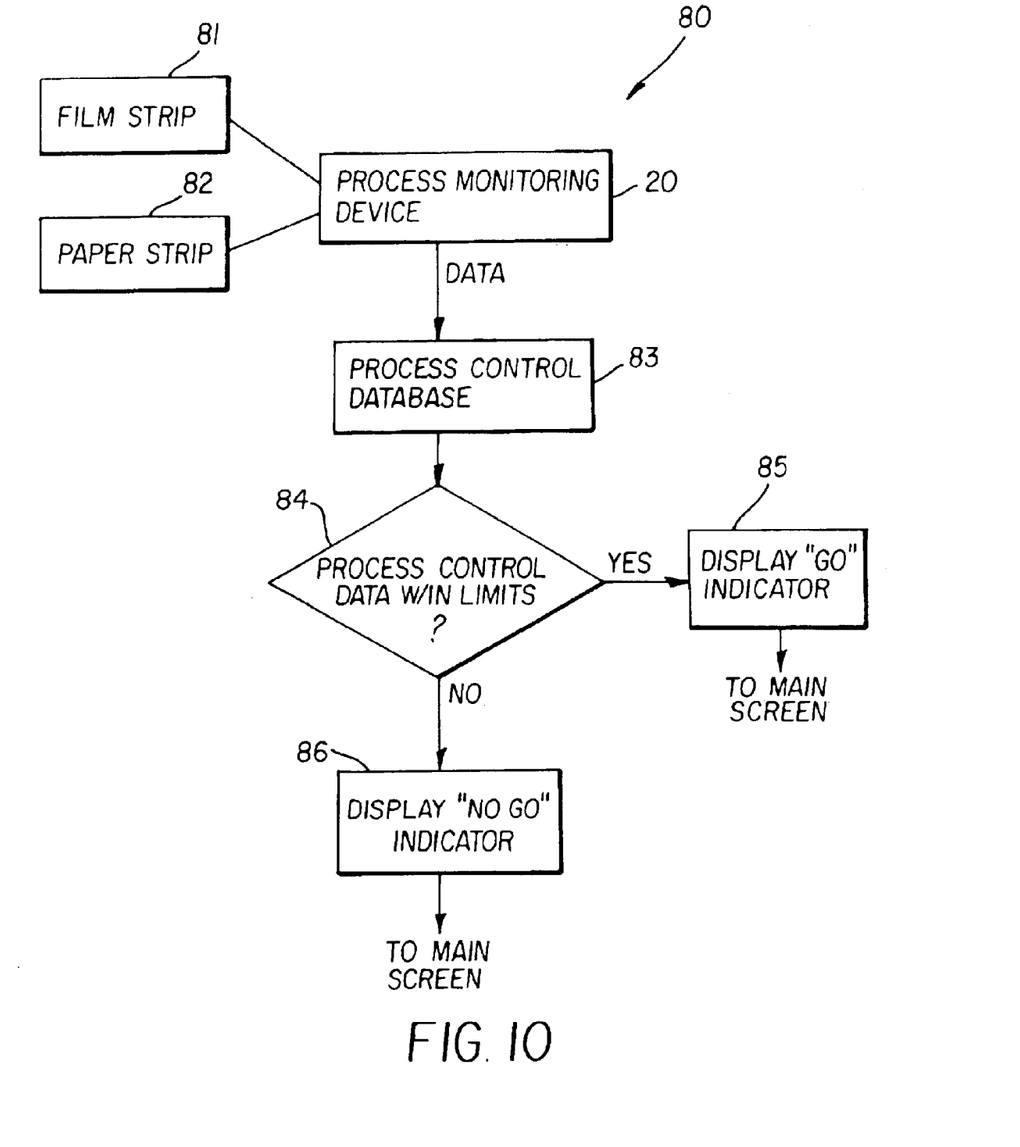
FIG. 10 is a block diagram showing the details of the process control application running on the client computer of FIG. 5.

Referring to FIG. 10, the process control application 80 will now be described. The employee begins with a processed film control strip 81 or a processed paper control strip 82. These control strips are measured by the process monitoring device 20 which feeds data into the process control database 83 via the client computer 22. The process control application 80 writes this information to the process control database 33. The process control application 80 compares the entered data with internally stored control limits 84. If the data is within limits, the process control application returns a go indicator 85 to the operator and writes this information to the process control database 33 of the quality management and reporting application 30 and terminates. If the data is not within limits, the process control application returns a no-go indicator 86 to the operator and writes this information to the process control database 33 of the quality management and reporting application 30 and terminates.

Figure 11:
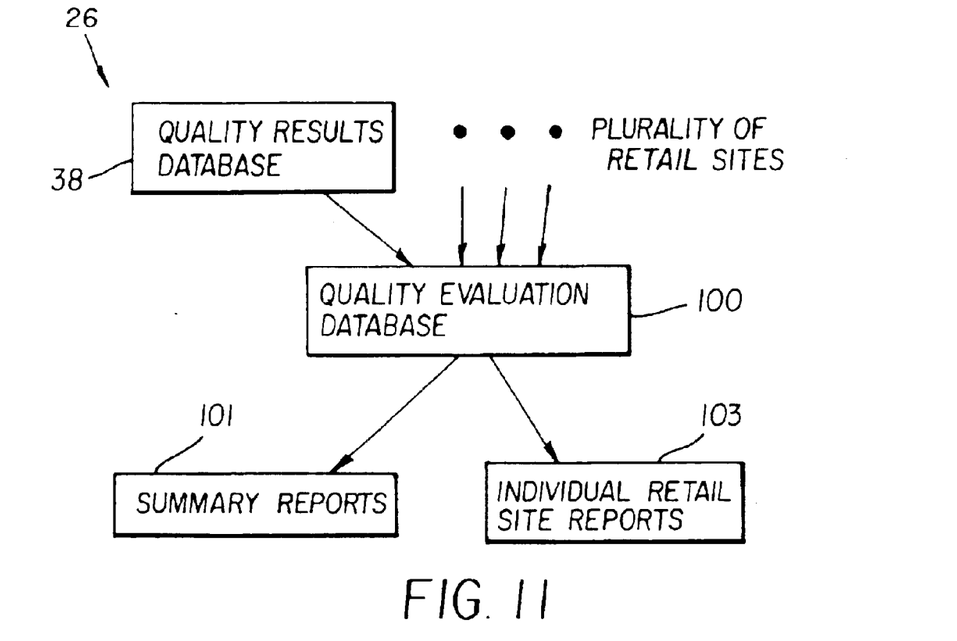
FIG. 11 is a block diagram showing the details of the quality evaluation database running on the service center computer of FIG. 3.

Referring to FIG. 11, the quality evaluation database 100 of the service center computer 26 will now be described. The quality evaluation database 100 receives quality results data from a plurality of quality results databases 38 of the quality management and reporting application 30 running on the client computer 22. The quality evaluation database 100 produces summary reports 101 and individual retail site reports 103.

Figure 12:
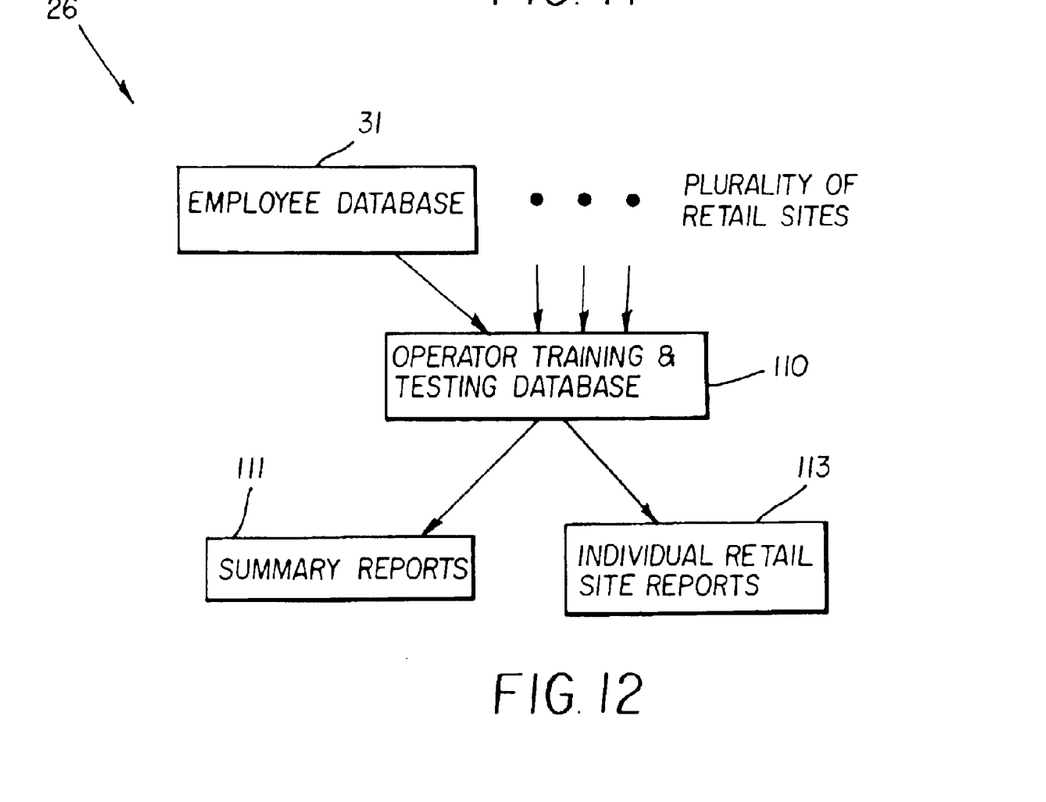
FIG. 12 is a block diagram showing the details of the operator training and testing database running on the service center computer of FIG. 3.

Referring to FIG. 12, the operator training and testing database 110 of the service center computer 26 will now be described. The operator training and testing database 110 receives operator training and testing data from a plurality of employee databases 31 of the quality management and reporting application 30 running on the client computer 22. The operator training and testing database 110 produces summary reports 111 and individual retail site reports 113.

Figure 13:
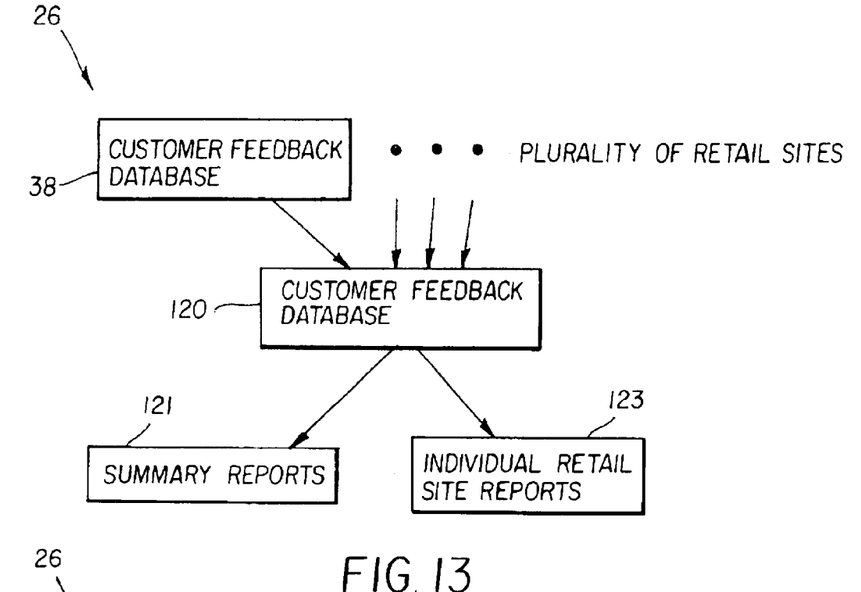
FIG. 13 is a block diagram showing the details of the customer feedback database running on the service center computer of FIG. 3.

Referring to FIG. 13, the customer feedback database 120 of the service center computer 26 will now be described. The customer feedback database 120 receives customer feedback data from a plurality of customer feedback databases 35 of the quality management and reporting application 30 running on the client computer 22. The customer feedback database 120 produces summary reports 121 and individual retail site reports 123.

Figure 14:
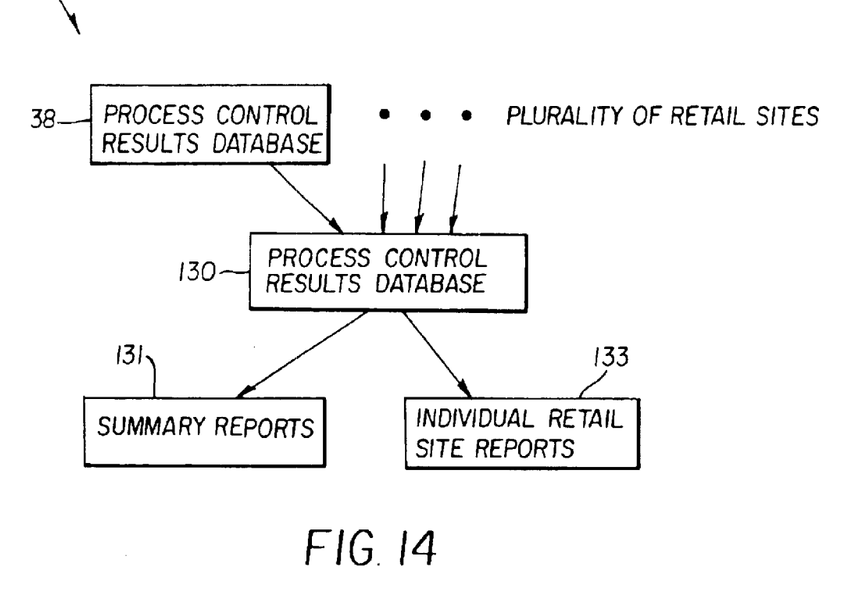
FIG. 14 is a block diagram showing the details of the process control results database running on the service center computer of FIG. 3.

Referring to FIG. 14, the process control results database 130 of the service center computer 26 will now be described. The process control results database 130 receives process control results data from a plurality of process control databases 33 of the quality management and reporting application 30 running on the client computer 22. The process control results database 130 produces summary reports 131 and individual retail site reports 133.

The invention has been described in detail with particular reference to certain preferred embodiments thereof, but it will be understood that variations and modifications can be effected within the spirit and scope of the invention.

PARTS LIST 10 photofinishing system
12 retail photofinishing site
14 service center
16 communication network
18 photofinishing equipment
20 process monitoring device
22 computer
24 modem
26 service center computer
27 remote support technician
28 modem
30 quality management and reporting application
31 employee database
32 training summary reports
33 process control database
34 process control summary reports
35 customer feedback and contact management database
36 customer feedback summary reports
37 customer contact log reports
38 quality results database
39 quality results summary reports
40 operator training and testing application
42 color vision test module
43 employee identification
44 color vision test
45 inform employee of color vision deficiency step
46 inform employee of passing color vision test step
50 operator training and testing module
52 pre-test
54 display list of training module step
56 list of training modules
58 proceed through training step
59 final test
60 quality evaluation application
61 enter employee identification
63 entry of order ID step
64 request input on photographic quality step
65 collect input on imperfection type step
66 request input on physical quality step
67 collect input on type of physical defect
68 request input on clerical quality step
69 collect input on type of clerical imperfection step
70 customer feedback collection application
71 employee identification
73 entry of order ID step
74 request category of complaint step
75 request input on resolution of complaint step
76 request input on level of manager follow-up step
77 request customer contact information step
80 process control application
81 film process control strip
82 paper process control strip
83 feed data into process control database step
84 compare data with control limits step
85 return go indicator step
86 return no go indicator step
100 quality evaluation database
101 produce summary report step
103 produce individual retail site report step
110 operator training and testing database
111 produce summary report step
113 produce individual retail site reports step
120 customer feedback database
121 produce summary report step
123 produce individual retail site report step
130 process control database
131 produce summary report step
133 produce individual retail site report step

What is claimed is:

1. A quality assurance system for retail photofinishing, comprising:
   a) a communication network;
   b) a retail photofinishing site including photofinishing equipment, a client computer connected to the communication network, and a process monitoring device connected to the computer;
   c) a computer located at a service center and connected to the communication network;
   d) client software running on the client computer, including:
      i) a quality management and reporting application for providing quality information to a manager of the photofinishing site,
      ii) an operator training and testing application for training and certifying an operator of the retail site and providing testing, training, and certification related data to the service center computer and the quality management application,
      iii) a quality evaluation application for monitoring the quality of the product and services provided by the photofinishing site and providing quality related data to the service center computer and the quality management application,
      iv) a process control application for monitoring the condition of the photofinishing equipment at the site and providing process control data to the service center computer and to the quality management application, and v) a customer feedback application for collecting customer feedback, managing follow-up by the retail site manager, and providing customer feedback data to the service center computer and the quality management application; and e) service center software running on the service center computer, including:
  i) an application for collecting, storing, and analyzing data from a plurality of photofinishing sites and producing a report on the quality of products and services provided by the sites, and wherein the operator testing and training application includes a color vision test and an operator training and testing module.

2. The system claimed in claim 1, wherein the client software further includes a remote service application for facilitating interaction with a remote support technician located at the service center and the server software further includes a remote service application for facilitating interaction between the remote support technician and photofinishing sites.

3. The system claimed in claim 2, wherein the process monitoring device is a densitometer or a flatbed scanner.

4. The system claimed in claim 1, wherein the operator training and testing module contains test on the topics of Understanding Color, Print Grading, Chemical Management, Minilab Maintenance, Customer Delight, Assertiveness, and Retail Selling.

5. The system claimed in claim 1, wherein the quality management and reporting application includes an employee database, a process control database, a customer feedback and contact management database, and a quality database.

6. The system claimed in claim 5, wherein the employee database contains employee identification information and operator training and testing information, and provides training summary reports.

7. The system claimed in claim 5, wherein the process control database contains process control information from the process control application and provides process control summary reports.

8. The system claimed in claim 5, wherein the customer feedback and contact management database contains customer feedback and contact information from the customer feedback application and provides customer feedback and summary reports.

9. The system claimed in claim 5, wherein the quality database contains quality evaluation information form the quality evaluation application and provides quality results reports.

10. The system claimed in claim 1, wherein the quality evaluation application evaluates photographic quality, physical quality, and clerical quality.

11. The system claimed in claim 10, wherein the customer feedback application collects customer feedback in the categories of photographic, physical, and clerical quality.

12. The system claimed in claim 5, wherein the process control application receives process control data from the process control monitoring device and writes this data to the process control database, compares the data with internally stored control limits, and generates a signal to an operator if the process control data is not within the control limits.

13. A quality assurance system for retail photofinishing, comprising:
  a) a communication network;
  b) a retail photofinishing site including photofinishing equipment, a client computer connected to the communication network, and a process monitoring device connected to the computer;
  c) a computer located at a service center and connected to the communication network;
  d) client software running on the client computer, including:
    i) a quality management and reporting application for providing quality information to a manager of the photofinishing site,
    ii) an operator training and testing application for training and certifying an operator of the retail site and providing testing, training, and certification related data to the service center computer and the quality management application,
    iii) a quality evaluation application for monitoring the quality of the product and services provided by the photofinishing site and providing quality related data to the service center computer and the quality management application,
    iv) a process control application for monitoring the condition of the photofinishing equipment at the site and providing process control data to the service center computer and to the quality management application, and
    v) a customer feedback application for collecting customer feedback, managing follow-up by the retail site manager, and providing customer feedback data to the service center computer and the quality management application; and
  e) service center software running on the service center computer, including:
    i) an application for collecting, storing, and analyzing data from a plurality of photofinishing sites and producing a report on the quality of products and services provided by the sites, and wherein the quality management and reporting application includes an employee database, a process control database, a customer feedback and contact management database, and a quality database.

14. The system claimed in claim 13, wherein the employee database contains employee identification information and operator training and testing information, and provides training summary reports.

15. The system claimed in claim 13, wherein the process control database contains process control information from the process control application and provides process control summary reports.

16. The system claimed in claim 13, wherein the customer feedback and contact management database contains customer feedback and contact information from the customer feedback application and provides customer feedback and summary reports.

17. The system claimed in claim 13, wherein the quality database contains quality evaluation information form the quality evaluation application and provides quality results reports.

18. The system claimed in claim 13, wherein the quality evaluation application evaluates photographic quality, physical quality, and clerical quality.

19. The system claimed in claim 13, wherein the process control application receives process control data from the process control monitoring device and writes this data to the process control database, compares the data with internally stored control limits, and generates a signal to an operator if the process control data is not within the control limits.

20. The system claimed in claim 15, wherein the operator testing and training application includes a color vision test and an operator training and testing module.

21. The system claimed in claim 20, wherein the operator training and testing module contains test on the topics of Understanding Color, Print Grading, Chemical Management, Minilab Maintenance, Customer Delight, Assertiveness, and Retail Selling.

* * * * *